United States Patent Office 3,005,832
Patented Oct. 24, 1961

3,005,832
EPOXY ALCOHOL PRODUCTION
George B. Payne, Berkeley, and William J. Sullivan, Oakland, Calif., assignors to Shell Oil Company, a corporation of Delaware
No Drawing. Filed June 25, 1959, Ser. No. 822,737
6 Claims. (Cl. 260—348)

This invention relates to the preparation of epoxy alcohols and, more particularly, to a new and useful process for the production of epoxy alcohols from epoxyaldehydes.

The epoxy alcohols, or glycidols as they are generally known, are useful for a wide variety of purposes. Because they include two types of functional groups, the epoxy or oxirane configuration

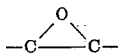

and the hydroxyl group, they are useful intermediates for the preparation of resinous materials, pharmaceuticals, plasticizers, dyes, surfactants and similar organic substances. They are also useful as extractants in numerous vegetable, animal and mineral oil extraction processes.

In the past, glycidols have been prepared by the reaction between epoxy halides, such as the epihalohydrins, and such alkaline reagents as alkali hydroxides, metal alcoholates, concentrated aqueous alkalies or carbonates or organic bases. Under these alkaline conditions, however, the epoxy ring is also attacked so that the yield of the glycidol is reduced and appreciable amounts of glycerols are obtained. See in this regard Rider and Hill, JACS 52, 1521–27 (1930).

Another mode of preparation of the glycidols has been to dehydrohalogenate a halogenated polyhydric alcohol under basic conditions, simultaneously closing the epoxy ring and removing the halogen to yield the epoxy alcohol. Such a process is described in the patent to Groll et al., U.S. 2,224,849, issued December 17, 1940, and the patent to Marple et al., U.S. 2,248,635, issued July 8, 1941. In the Malkemus et al. patent, U.S. 2,856,413, glycidol is prepared by heating glycerol carbonate in the presence of a metal salt so that the carbonate is decomposed.

It is an object of the present invention to provide a method for the preparation of epoxy alcohols from epoxyaldehydes. A further object of the invention is the provision of a method for preparing epoxy alcohols under conditions such that the epoxy ring of the starting aldehyde is preserved intact in the product alcohol. Still a further object of the invention is a method for preparing epoxy alcohols in high yield and under comparatively mild conditions of temperature and pressure. Other objects will be apparent from the following description of the process.

These and other objects are accomplished in the process of the present invention by reacting together under substantially anhydrous conditions an epoxy alkanal and hydrogen at a temperature below about 200° C. in the presence of a catalytic amount of copper chromite. Under these conditions, only the formyl group of the epoxy alkanal reacted and the epoxy group remained intact. This is particularly surprising in view of the well-known tendency of the epoxy ring to open upon hydrogenation and form a hydroxyl group.

The epoxy alkanal reactant in the process includes aliphatic compounds characterized by possession of both the formyl group —CHO and the epoxy or oxirane group

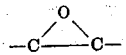

The compounds may have one or more of each of these groups. Such compounds are readily prepared by epoxidation of unsaturated aldehydes. Representative epoxy alkanals include those epoxy compounds produced by the oxidation of alpha, beta-unsaturated aldehydes such as acrolein, methacrolein, crotonaldehyde, tiglic aldehyde, citral, and the like. Of these epoxy alkanals, those having from 1 to 8 carbon atoms are preferred because of the useful nature of the epoxy alcohols prepared therefrom. Most preferred, because of its high reactivity, is glycidaldehyde, prepared by epoxidation of acrolein. Also useful, however, in the process are those epoxy alkanals prepared from olefinic aldehydes having one or more double bond further removed from the formal group. Typical examples of such aldehydes are vinyl acetaldehyde, 3-pentenal, 4-pentenal, methyl vinyl acetaldehyde, isopropenyl acetaldehyde, citronellal and rhodinal.

These epoxy alkanals are reacted with hydrogen under substantially anhydrous conditions and in the presence of a catalytic amount of copper chromite. Although it is known that under most hydrogenation conditions the epoxy ring is opened, it has been unexpectedly found that under the particular conditions of this process the formyl group of the epoxy alkanal is selectively hydrogenated and the epoxy ring remains intact. By copper chromite is meant the mixed oxides of copper and chromium. The catalyst may be made by a number of procedures, for example, by the decomposition of copper ammonium chromate, by the decomposition of precipitated copper ammonium chromium carbonates or by the decomposition of mixed copper-chromium nitrates. Similarly, copper oxide and chromium oxides may be ground or heated together to yield an operative catalyst. Such catalysts are commercially available under the name copper chromite and will be so referred to in the following specification and claims.

Particularly useful are those copper chromite catalysts containing at least 40–50% by weight of copper oxide. The catalysts may also contain a minor amount of one or more metals or their oxides, as may be found desirable to initiate or promote the reaction under particular conditions. The catalyst may be employed as fine powder, as pellets or supported on such inert substances as kieselguhr, silica gel or diatomaceous earth. The exact amount of catalyst employed will depend on its activity and its surface area. The copper chromite should be present in the reaction mixture, however, in an amount of at least about 5% by weight and preferably from 10 to 30%, based on the epoxy alkanal. Less catalyst than about 5% by weight renders the reaction sluggish, while more than about 8% serves no useful purpose.

In view of the well-known tendency of oxirane rings to be reduced to alcohols by catalytic hydrogenation, it is surprising that copper chromite is sufficiently selective under the reaction conditions described to reduce the formyl group without attacking the ring. For example, nickel or palladium catalyst is known to produce ethyl alcohol when ethylene oxide is hydrogenated; see Ushakov et al., J. Gen. Chem. (USSR) 7, 249 (1937), while cyclohexene oxide is reduced to cyclohexanol with hydrogen over a nickel catalyst, Brunel, Ann. Chim. [8] 6, 237 (1905).

By conducting the reaction at temperatures below about 200° C., the tendency of the oxirane ring of the epoxyalkanal to be opened is reduced. Furthermore, at temperatures above about 250° C. decomposition of the catalyst also takes place. On the other hand, the hydrogenation reaction proceeds sluggishly at temperatures below about 50° C. and is preferably conducted above that temperature. The most preferred temperature range in which good reaction yields are obtained at reasonable reaction rates is between about 70° to about 125° C.

The reaction is conducted at elevated hydrogen pressure. While the reaction rate will depend on the nature of the copper chromite catalyst and the temperature of the system, it has been found that hydrogenation proceeds most smoothly at pressures between about 500–1400 p.s.i.g.

The copper chromite catalyst is adversely affected by moisture, and the process of this invention is therefore best carried out under substantially anhydrous conditions. The epoxy alkanals used should be as free from traces of water as possible, drying being conducted by distillation or with the aid of such agents as magnesium sulfate. The catalyst may also be pretreated to remove condensed or adsorbed moisture, preferably by heating in air or vacuum, or by refluxing in non-aqueous liquids at temperatures above 100° C.

The hydrogenation process of the invention may be conducted in a non-hydrogenatable diluent, preferably one which is a solvent for both the starting epoxy alkanal and the product epoxy alcohol. Suitable solvents are such saturated organic alcohols as methanol, ethanol and isopropanol, such ethers as diethyl ether, methyl ethyl ether, tetrahydrofurane, dioxane, and the dimethyl ether of ethylene glycol; both oxygenated and chlorinated saturated organic solvents are equally suitable. In general, the diluent should be an inert liquid with solvent properties with which neither the epoxy alkanal nor the product alkanol react and which does not compete for hydrogen in the course of the process.

At the close of the reaction, the product may conveniently be recovered by distilling off the solvent or by other methods known to the art. In such separations care must be taken to avoid subjecting the reaction mixture to conditions whereby the epoxide ring is attacked.

The following examples will illustrate the procedures by which the process of the invention may be conducted. It should be understood, however, that these examples are merely illustrative and are not to be regarded as limitations to the appended claims, since the basic teachings therein may be varied at will, as will be understood by one skilled in the art. In the examples, the proportions are expressed in parts by weight unless otherwise noted.

Example I

The following experiments were conducted in a conventional heated and shaken high-pressure vessel. In the experiments, the catalyst, solvent and glycidaldehyde were charged to the vessel, which was then sealed, pressured with hydrogen, and heated with shaking. Progress of the hydrogenation was followed by observing the pressure of the vessel. Maximum pressure at the reaction temperature was about 700–800 p.s.i.g. in each run.

Catalysts employed throughout were commercially available forms. Activation of the catalyst was accomplished by refluxing it overnight in cyclohexanol.

At the end of each run, the vessel was cooled, the catalyst filtered from the reaction mixture, and samples of the mixture taken for analysis. In all cases separation of the product glycidol from the reaction mixture was achieved by Claisen distillation.

| Max. Temp., ° C. | Max. Pressure, p.s.i.g. | Catalyst | Grams Wt. | Grams Glycidaldehyde Charged | Solvent | Grams Wt. | Percent Yield Distilled Glycidol |
|---|---|---|---|---|---|---|---|
| 25 | 1,600 | Pd on BaSO₄ | 5 | 50 | water | 250 | <3 |
| 80 | 800 | 5% ruthenium on charcoal | | 72 | glacial acetic acid | | 18 |
| 75 | 820 | 10% palladium on charcoal | 5 | 14.4 | water | 100 | 0 |
| 32 | 640 | do | 5 | 14.4 | do | 100 | <3 |
| 75 | 800 | copper chromite | 2 | 14.4 | tetrahydrofuran | 86 | 52 |
| 95 | 835 | do | 2 | 14.4 | do | 86 | 32 |
| 100 | 770 | do | 2 | 14.4 | do | 86 | 48 |
| 93 | 580 | do | 2 | 14.4 | water | 86 | 0 |
| 76 | 795 | do | 2 | 43.3 | tetrahydrofuran | 86 | 51 |
| 93 | 679 | do | 6 | 28.8 | do | 174 | 46 |
| 80 | 740 | do | 6 | 28.8 | do | 174 | 52 |

Example II

Using the techniques employed in the experiments conducted above, the following epoxy alcohols are prepared in good yield from the epoxy alkanals listed in the presence of copper chromite catalyst.

| Epoxyalkanal | Epoxyalkanol |
|---|---|
| 2,3-epoxybutanal. | 2,3-epoxybutanol. |
| 3,4-epoxypentanal. | 3,4-epoxypentanol. |
| 2,3,4,5-diepoxyhexanal. | 2,3,4,5-diepoxyhexanol. |
| 2-methyl-3,4-epoxybutanal. | 2-methyl-3,4-epoxybutanol. |
| 1,2-epoxyhexan-3-al. | 1,2-epoxyhexanol-3. |

We claim as our invention:

1. A process for preparing a vic-epoxy alkanol which comprises reacting together under substantially anhydrous conditions a vic-epoxy alkanal of up to 8 carbon atoms and hydrogen at a pressure from about 500 to about 1400 p.s.i.g. and at a temperature from about 50° C. to about 200° C. in the presence of a catalytic amount of copper chromite.

2. A process for preparing a vic-epoxy alkanol which comprises reacting together in a substantially anhydrous inert solvent a vic-epoxy alkanal of up to 8 carbon atoms and hydrogen at a temperature from about 50° C. to about 200° C. and a pressure from about 500 to about 1400 p.s.i.g. in the presence of a catalytic amount of copper chromite.

3. A process for preparing a vic-epoxy alkanol which comprises reacting together in substantially anhydrous tetrahydrofurane a vic-epoxy aldehyde of up to 8 carbon atoms and hydrogen at a temperature from about 50° C. to about 200° C. and a pressure from about 500 to about 1400 p.s.i.g. in the presence of a catalytic amount of copper chromite.

4. A process for preparing glycidol which comprises reacting together substantially anhydrous glycidaldehyde and hydrogen at a pressure from about 500 to about 1400 p.s.i.g. and a temperature from about 50° C. to about 200° C. in the presence of a catalytic amount of copper chromite.

5. A process for preparing glycidol which comprises reacting together glycidaldehyde and hydrogen in substantially anhydrous tetrahydrofurane at a temperature from about 50° C. to about 200° C. and a pressure from about 500 to about 1400 p.s.i.g. in the presence of a catalytic amount of copper chromite.

6. In the process of preparing glycidol by hydrogenating glycidaldehyde at a pressure from about 500 to about 1400 p.s.i.g. and at a temperature from about 50° C. to about 200° C., the improvement which comprises conducting the hydrogenation under substantially anhydrous conditions and in the presence of a catalytic amount of copper chromite.

References Cited in the file of this patent

Wagner et al.: Synthetic Organic Chemistry, pages 149–152 (1953).

Chem. & Eng. News, vol. 37, No. 16, pages 49 and 50, Apr. 20, 1959.